3,309,390
PREPARATION OF HYDROXY-ENDBLOCKED SILOXANE FLUIDS
George M. Omietanski, Tonawanda, N.Y., assignor to Union Carbide Corporation, a corporation of New York
No Drawing. Filed July 1, 1963, Ser. No. 292,147
17 Claims. (Cl. 260—448.2)

This invention relates to an improved process for the preparation of hydroxy-endblocked linear diorganopolysiloxanes. More particularly, it relates to the process of contacting a cyclic diorganopolysiloxane trimer with water in the presence of an ion-exchange catalyst to form a hydroxy-endblocked linear diorganopolysiloxane product.

Hydroxy-endblocked linear diorganopolysiloxanes are well-known materials in the organosilicon art. Such materials have been prepared, for example, by controlled hydrolysis of diorganodihalosilanes, by neutralization of metal ester endblocked linear diorganosiloxanes, by reaction of diorganopolysiloxanes with water and an organic nitrile in the presence of a basic catalyst, by reaction of diorganopolysiloxanes with aqueous solutions of monobasic acids and by reaction of completely condensed dimethylpolysiloxanes with steam at elevated temperature and elevated pressure. Most of these prior art processes have the disadvantage that a mixture of products is prepared necessitating complex methods of separation to obtain specific desired products. Further, none of these prior art processes are useful for the production of stable, well-defined hydroxy-endblocked linear dimethylpolysiloxanes containing from about 3 to about 14 weight percent hydroxyl groups.

It is an object of the present invention to provide a process of preparing stable, well-defined hydroxy-endblocked linear diorganopolysiloxanes.

It is a further object of the present invention to provide a process of preparing stable, well-defined hydroxy-endblocked linear dimethylpolysiloxanes containing from about 3 to about 14 weight percent hydroxyl groups.

According to the present invention, cyclic diorganopolysiloxane trimer such as cyclic dimethylpolysiloxane trimer, is reacted with water in the presence of an ion-exchange catalyst and a hydroxy-endblocked linear diorganopolysiloxane product is recovered from the reaction mixture. Higher cyclics, such as cyclic tetramer and cyclic pentamer, do not react in this manner to give stable, well-defined products.

The cyclic diorganopolysiloxane trimers useful as reactants in the novel process are represented by compounds having the formula:

[R¹R²SiO][R³R⁴SiO][R⁵R⁶SiO]

wherein $R^1$, $R^2$, $R^3$, $R^4$, $R^5$ and $R^6$ can be selected from the class consisting of hydrocarbyl radicals, substituted alkyl radicals and substituted aryl radicals. The hydrocarbyl radicals which are represented by $R^1$–$R^6$ in the above formula are illustrated by alkyl groups, such as methyl, ethyl, propyl, isopropyl, butyl, isobutyl, amyl, hexyl and the like; aryl groups, such as phenyl, naphthyl and the like; alkaryl groups, such as tolyl, ethylphenyl, xylyl, mesityl and the like; aralkyl groups such as benzyl, phenylethyl and the like; alkenyl groups, such as vinyl, allyl and the like; and alicyclic groups, such as cyclopentyl, cyclohexyl and the like. The substituted alkyl radicals which are represented by $R^1$–$R^6$ in the above formula are illustrated by gamma-cyanopropyl, alpha-chloropropyl, gamma-chloropropyl and the like. The substituted aryl radicals which are represented by $R^1$–$R^6$ in the above formula are illustrated by meta-nitrophenyl, para-chlorophenyl, ortho-cyanophenyl and the like. The $R^1$–$R^6$ groups could all be the same or different. Preferably all the $R^1$–$R^6$ groups are methyl radicals. These cyclic trimers are well-known in the organosilicon art and are prepared by well-known techniques.

The ion-exchange catalysts useful in this novel process can be in the form of liquids or solid resins. The solid resins are preferred since they provide a separate phase in the reaction system and can be easily separated from the reactants and products. The more fine-grained the ion exchange resin, the greater the catalytic surface that is exposed and thus the smaller is the amount required. These ion-exchange catalysts can be either acidic cation exchange materials in the free acid form or basic anion exchange materials in the free base form. The strongly acidic or basic types are preferred since they enhance the rate of reaction, but the weakly-acidic and weakly-basic types can also be used. Mixtures of acid and base exchange resins can also be used. It has been found that the strongly-basic ion-exchange resins tend to favor formation of hydroxy-endblocked linear hexamers whereas the strongly acidic catalysts tend to favor formation of hydroxy-endblocked linear trimers. The ion-exchange catalyst should be present in the reaction system preferably in an amount of about 1 to 20 parts by weight per 100 parts by weight of the cyclic diorganopolysiloxane trimer reactant. If a continuous process is employed whereby the cyclic trimer and water flow through a bed of ion-exchange resin, the above amount of ion-exchange catalyst is measured with respect to the amount of cyclic trimer which is present in the system at any given moment in contact with the ion-exchange catalyst. The ion-exchange resins should be properly purified and placed in proper reactive form before use in the present process. The resins which are supplied in the free acid or free base form are allowed to stand in contact with distilled water at room temperature for several hours in order to remove any color or other leachable material. The resin is then washed several times with distilled water, filtered and immediately used. If the acidic cation exchange material is supplied in the salt or reacted form, it is then washed with dilute acid, such as HCl, and then washed with distilled water until pH of the effluent is about 7.0. If the basic anion exchange material is supplied in the salt or reacted form, it is then washed with alkali, such as sodium hydroxide, and then washed with distilled water until the pH of the effluent is about 7.0. Since the ion-exchange catalyst is not consumed or altered during the reaction between water and the cyclic diorganosiloxane trimer, it can be reused for additional production of hydroxy-endblocked linear diorganopolysiloxanes.

The ion-exchange materials useful in the present invention are well known and are available commercially from several sources. Typical acidic cation exchange materials and their preparation are described, for example, in U.S. 2,340,110, 2,366,007, and 2,681,320. Typical basic anion exchange materials and their preparation are described, for example, in U.S. 2,366,008, 2,591,573, 2,591,574, and 2,681,391. Such materials, for example, can consist of polymerized styrene-divinylbenzene containing reactive ion-exchange sites. Other materials such as phenolformaldehyde resins, polystyrene and coal derivatives, can also be employed which contain the proper reactive sites. In the strongly-acidic cation exchange materials the reactive sites are generally sulfonic acid groups. In the weakly-acidic cation exchange materials the reactive sites are generally carboxylic groups. In the strongly-basic anion exchange materials the reactive sites are generally quaternary ammonium groups, such as trimethylbenzylammonium groups. In the weakly-basic anion exchange materials the reactive sites are generally primary and secondary polyamino groups, such as diethylenetriamino groups and the like. The strongly-acidic cation exchange resins can be prepared by the following well-known general technique. Styrene and divinylbenzene are thoroughly mixed and an organic peroxide curing catalyst is dissolved in the mixture. This solution is poured into an equal or larger quantity of water and dispersed into droplets throughout the aqueous phase by agitation. The suspension is then heated until polymerization begins. The droplets increase in viscosity, pass through sticky then rubbery stages and finally become hard spheres as the polymer grows. The polymerization is completed by continued heating in the reaction vessel or, after filtering the beads out of the water, in ovens. The styrene-divinylbenzene beads are now transferred to another vessel where they are heated and reacted with concentrated sulfuric acid or other sulfonating agents such as chlorosulfonic acid. Between 8 and 10 —$SO_3H$ groups are introduced for every 10 benzene rings in the polymer. The residual sulfuric acid is diluted by the slow addition of water. The diluted acid is filtered off, the polymer beads are washed with water and finally neutralized with NaOH or $Na_2CO_3$. The neutralized product can be reconverted to the free acid form by washing the resin with dilute hydrochloric acid, for example. Weakly-acid cation exchange resins can be prepared by suspension copolymerization of methacrylic acid and divinylbenzene. The resulting resin contains —COOH groups. Strongly-basic anion exchange resins can be prepared by suspension copolymerization of styrene and divinyl benzene. The polymer beads are reacted with chloromethyl ether, in the presence of aluminum chloride or zinc chloride catalyst, to introduce —$CH_2Cl$ groups on the benzene rings of the polymer. This product is then aminated with trimethylamine, for example, to form a highly ionized quaternary ammonium group on the benzene rings. Weakly-basic anion exchange resins are prepared by suspension copolymerization of styrene and divinylbenzene, followed by chloromethylation and amination with diethylene triamine, for example. After washing with water the resin is neutralized with alkali to convert it to the free base form.

Strongly-acidic cation exchange materials useful in the present invention are sold under the following illustrative trade names by the indicated suppliers:

| Reactive Group | Trade Name | Supplier |
|---|---|---|
| Sulfonic | Dowex 50W-X-8 | Dow Chemical Co. |
| Do | Amberlite IR-120 | Rohm and Haas Co. |
| Do | Permutit Q | The Permutit Co. |
| Do | Zeo-Karb | Do. |
| Do | Nalcite HCR | National Aluminate Corp. |
| Do | Nalcite HGR | Do. |
| Do | Nalcite HDR | Do. |

The strongly-basic anion exchange resins useful in the present invention are sold under the following illustrative trade names by the indicates suppliers:

| Reactive Group | Trade Name | Supplier |
|---|---|---|
| Quaternary | Amberlite IRA-401 | Rohm and Haas Co. |
| Do | Nalcite SBR-P | National Aluminate Corp. |
| Do | Nalcite SBR | Do. |
| Do | Dowex 21K | Dow Chemical Co. |
| Do | Dowex 1 | Do. |
| Do | Dowex 2 | Do. |
| Do | Doulite A-101 | Chemical Process Co. |
| Do | Doulite A-102 | Do. |
| Do | Permutit S | The Permutit Co. |

The weakly-acidic cation exchange resins useful in the present invention are sold under the following illustrative trade names by the indicated suppliers:

| Reactive Group | Trade Name | Supplier |
|---|---|---|
| Carboxylic | Amberlite IRC-50 | Rohm and Haas Co. |
| Do | Permutit H-70 | The Permutit Co. |

The weakly-basic anion exchange resins useful in the present invention are sold under the following illustrative trade names by the indicated suppliers:

| Reactive Group | Trade Name | Supplier |
|---|---|---|
| Polyamine | Amberlite IR-45 | Rohm and Haas Co. |
| Do | Amberlite IRA-50 | Do. |
| Do | Permutit A | The Permutit Co. |
| Do | De-Acidite | Do. |
| Do | Dowex 3 | Dow Chemical Co. |
| Do | Nalcite WBR | National Aluminate Corp. |

Water is one of the reactants in the subject process and is generally used in amounts in excess of one mole of water for each mole of cyclic diorganopolysiloxane trimer. It is preferred to use about four moles of water for each mole of cyclic diorganopolysiloxane trimer. A larger excess can be used if desired without any material advantage. Most of the above-described ion-exchange resins as supplied contain about 30–60 weight percent water. All of the water required for the reaction could come from this contained-water in the resin, but additional water is supplied so that the stresses of dehydration on the resin are lessened. This type of treatment tends to prolong the life of the resin since resin de-hydration tends to create fines and makes the resin more difficult to handle during the process. It is preferable that the water contained within the ion-exchange resin not be included in the calculations for reactant water required in the process.

The process conditions for carrying out the present invention are not narrowly critical. At atmospheric pressure, the reaction temperature is from about 20° C. to about 100° C. Lower temperatures can be used if desired but without material benefit. As the reaction temperature exceeds about 100° C. the siloxane and water reactants will volatilize from the reaction mixture and the ion-exchange resins begin to degrade. In general, the higher temperatures favor short reaction times for the preparation of desired products contain high hydroxyl amounts. The reaction can be carried out at atmospheric pressure but pressures above and below atmospheric can be used if desired with no material advantages. In general, the hydroxy content of the hydroxy-end-blocked polysiloxane product of the present process tends to decrease with reaction time and the rate of this decrease increases with reaction temperature. In addition, the conversion of cyclic trimer starting material to hydroxy-endblocked product increases with reaction time. Short reaction times at elevated temperature thus favor production of hydroxy-endblocked products containing high hydroxyl content. As the reaction time at temperature is increased, the overall conversion of starting material to hydroxy-containing product increases, but the hydroxy-content of such product decreases. In carrying out this reaction, one must balance the desirable goals of high conversion and high hydroxy-content in product in selecting the particular combination of reaction times and temperatures.

Although a solvent is not necessary for the above-described reaction to take place between the cyclic trimer and water in the presence of an ion-exchange catalyst, the presence of a mutual organic solvent is extremely beneficial with regard to rate of reaction, conversion to product, yield, and ease of carrying out the reaction. The organic solvents useful in this process must be solvents for the cyclic trimer starting material as well as being water-miscible. They must further have the characteristic of being inert and non-reactive with the starting materials and products of the reaction. Examples of inert organic solvents useful in the present invention are acetone, methylethylketone, tetrahydrofuran and the like. It is preferred that the solvent be used in an amount just necessary to dissolve the cyclic trimer starting material.

The preferred amount of solvent is from about 0.5 gram solvent per gram of trimer to about 5 grams of solvent per gram of trimer.

The present invention is further described in the following examples.

Example 1

In a 5-liter, round-bottom, 3-necked flask, equipped with a stirrer and reflux condenser, were placed 850 g. of hexamethylcyclotrisiloxane, 2 liters of reagent grade acetone and 300 ml. of distilled water. The flask was placed in a water bath maintained at a temperature of about 55–56° C.; and, when the system reached steady reflux conditions, 140 g. of washed Amberlite IR–120 cation-exchange resin were added. The resin was a styrene-divinylbenzene copolymer having sulfonic acid reactive sites and containing 44–48 weight percent water. It had a cationic exchange capacity of 4.5 milliequivalents/gm. of resin and was in the form of beads having effective size of 0.45–0.60 mm. The mixture was stirred for 2.5 hours and then was rapidly filtered free of resin. The resulting clear to slightly hazy solution was poured into about five times its volume of cold distilled water covered with a layer of benzene. Sodium bicarbonate had been previously added to the distilled water so that the solution was at a pH of about 8.4. This well-known technique minimizes the condensation of the siloxane product to higher molecular weight compounds. If the benzene layer was omitted, unreacted trimer starting material would precipitate. The use of benzene for this purpose is also a well-known technique. The upper benzene layer containing the unreacted trimed together with the desired hydroxy-endblocked siloxane was separated from the lower aqueous layer. The aqueous layer was extracted several times with 50 ml. portions of benzene. These benzene extractants were then combined with the previously obtained upper benzene layer and were dried over anhydrous sodium sulfate and stripped of solvent. Fractionation of the extractant residue through a Vigreaux column yielded 377 g. (41 mole percent yield based on amount of cyclic trimer starting material) of hexamethyltrisiloxane-1,5-diol having the properties of: boiling point, 89–91° C./3 mm. Hg, refractive index of $n_D^{25°}=1.4064$; density of $d_{25°}^{25°}=0.99$ g./ml.; melting point of $-1.9°$ C. The product was analyzed and the results indicated: 30.5% C, 8.6% H, 34.9% Si, 14.1% OH. Theory for $HO(Me_2SiO)_3H$: 30.0% C, 8.4% H, 35.0% Si, 14.15% OH. The calculated molar refraction was 59.38 and the observed value was 59.07.

A second fraction from the above product mixture consisting of 100 g. of dodecamethylhexasiloxane-1,11-diol was obtained in 5.6 mole percent yield. This fraction had the following properties: boiling point, 114–117° C./0.9 mm. Hg, refractive index of $n_d^{25°}-1.4073$; density of $d_{25°}^{25°}=0.9882$. The product was analyzed and the results indicated: 31.6% C, 8.5% H, 36.3% Si, 7.9% OH, molar refraction, 115.3. Theory for $HO(Me_2SiO)_6H$: 31.2% C, 8.3% H, 36.3% Si, 7.35% OH, molar refraction of 115.3.

Additional reactions between a cyclic dimethylpolysiloxane trimer and water in the presence of an ion-exchange catalyst are summarized in the following table.

TABLE I

| Trimer, grams | Acetone, ml. | Added Water, ml. | Ion-Exchange Resin, grams | Temp., ° C. | Time, hrs. | OH Content Product (weight percent) |
|---|---|---|---|---|---|---|
| 50 | 150 | 20 | [1] 10 | 67 | 25 | 3.1 |
| 25 | 75 | 10 | [2] 5 | 25 | 144 | 6.8 |
| 50 | 150 | 20 | [2] 10 | 67 | 25 | 7.7 |
| 111 | 300 | 60 | [3] 20 | 25 | 72 | 5 |
| 300 | 300 | 25 | [4] 50 | 56 | 3.67 | 10.7 |
| 222 | 100 | [5] 0 | [4] 38 | 56 | 4.25 | 8.8 |
| 222 | 0 | [5] 0 | [4] 40 | 76 | 2.33 | 3.7 |
| 850 | 2,300 | 300 | [6] 140 | 56 | 3 | 14.1 |

[1] Amberlite IRA-50 resin (weakly-basic). This resin was a styrene-divinylbenzene copolymer having methylamino and dimethylamino reactive sites and containing about 37-45 weight percent water. It had an anionic exchange capacity of about 5.0 milliequivalents/gm. of resin and was in the form of beads having effective size of 0.35-0.50 mm.
[2] Amberlite IR-345 resin (weakly-basic).
[3] A mixture of Amberlite IR-120 resin (strongly-acidic) and Amberlite IRA-401 resin (strongly-basic). The latter resin was a styrene-divinylbenzene copolymer having quaternary ammonium reactive sites and containing about 54-59 weight percent water. It had an anionic exchange capacity of about 3.5 milliequivalents/gm. of resin and was in the form of beads having effective size of 0.40-0.50 mm.
[4] Amberlite IR-120 resin (strongly-acidic).
[5] Water for the reaction was contained in the ion-exchange resin.
[6] Dowex 50W-X-8 resin (strongly-acidic). This resin has characteristics similar to Amberlite IR-120.

Example 2

A glass column about 20 inches high and 0.75 inch in diameter was filled with the strongly-basic resin Amberlite IRA–401. The column was back washed to free it of voids. The column was pre-treated with a solution of 35 ml. of water in 350 ml. of acetone. Then a solution of 111 g. of cyclic dimethylsiloxane trimer is a mixture of 35 ml. water and 350 ml. acetone was passed through the column at the rate of 7 ml./min. This solution was followed through the column with a solution of 35 ml. water and 350 ml. acetone. The effluent was added to excess distilled water, the siloxane layer was separated, dried over anhydrous sodium sulfate and stripped in a rotary evaporator at about 50° C. at 3 mm. Hg pressure. There was obtained 72 g. (64% conversion) of a hydroxy-endblocked siloxane fluid having a viscosity of 23 centipoises and a hydroxyl content of 4.9%.

As mentioned above, the hydroxyl content of the hydroxy-endblocked siloxane products of the present invention will tend to decrease as the reaction time is increased and the overall conversion of starting material to hydroxy-containing product will tend to increase. These variations are shown by the following tables.

TABLE II

Time-composition study of the system: 555 g. $[Me_2SiO]_3$ 1500 ml. acetone; 200 ml. $H_2O$; 94 g. Amberlite IR–120 resin at ambient room temperature.

| Reaction time (hrs.) | OH content of product (weight percent) |
|---|---|
| 11.5 | 13.3 |
| 23.7 | 12.9 |
| 47 | 12.7 |
| 71 | 11.3 |
| 102.5 | 10.4 |
| 169 | 9.1 |

TABLE III

Time-composition study of the system: 555 g. [Me₂SiO]₃ 1500 ml. acetone; 200 ml. H₂O; 94 g. Amberlite IR-120 resin at 56° C.

| Reaction time (hrs.): | OH content of product (weight percent) |
|---|---|
| 0.50 | 14.0 |
| 1.33 | 14.0 |
| 5.00 | 12.1 |
| 17.30 | 5.4 |
| 91.3 | 3.4 |

It can be seen from the above Tables II and III that as the reaction temperature is increased, the hydroxyl content of the product decreases more rapidly as reaction time is increased.

TABLE IV

The effect of time on conversion and yield of the system: 850 g. [Me₂SiO]₃; 2300 ml. acetone; 300 ml. H₂O; 140 g. Amberlite IR-120 resin at 56° C.[1]

| Reaction time (hrs.) | Conversion to Hydroxy Fluid (percent)[2] | Yield of HO(Me₂-SiO)₃H (percent)[3] |
|---|---|---|
| 2.00 | 36 | 96 |
| 2.25 | 41 | 96 |
| 4.00 | 57 | 96 |
| 6.50 | 72 | 82 |

[1] Product was washed with sodium bicarbonate solution to minimize condensation.

[2] $\text{Percent} = \frac{\text{weight of product}}{\text{weight of trimer}} \times 100$.

[3] $\text{Percent} = \frac{\text{weight of HO(Me}_2\text{SiO)}_3\text{H}}{\text{weight of total product}} \times 100$.

The hydroxy-endblocked diorganopolysiloxanes produced by the process of the present invention are useful in low temperature curable polysiloxane systems, mold release agents, water-proofing agents, adhesives and anti-foaming agents for aqueous systems.

What is claimed is:

1. A process for the production of hydroxy-endblocked linear diorganopolysiloxanes which comprises contacting a cyclic diorganopolysiloxane trimer with water in the presence of an ion-exchange catalyst, and recovering a hydroxy-endblocked linear diorganopolysiloxane product from the reaction mixture.

2. A process for the production of hydroxy-endblocked linear diorganopolysiloxanes which comprises contacting a cyclic diorganopolysiloxane trimer with water in the presence of an ion-exchange catalyst wherein the water is present in an amount of about four moles of water for each mole of cyclic trimer and the ion-exchange catalyst is present in an amount of about 1 to 20 parts by weight per 100 parts by weight of cyclic trimer, and recovering a hydroxy-endblocked linear diorganopolysiloxane product from the reaction mixture.

3. A process for the production of hydroxy-endblocked linear diorganopolysiloxanes which comprises contacting a cyclic diorganopolysiloxane trimer with water in the presence of an ion-exchange catalyst and a water miscible inert organic solvent, and recovering a hydroxy-endblocked linear diorganopolysiloxane product from the reaction mixture.

4. A process as claimed in claim 3 wherein the solvent is selected from the class consisting of acetone, methylethylketone and tetrahydrofuran.

5. A process for the production of hydroxy-endblocked linear diorganopolysiloxanes which comprises contacting a cyclic diorganopolysiloxane trimer with water in the presence of an ion-exchange catalyst and a water miscible inert organic solvent, wherein the water is present in an amount of about four moles of water for each mole of cyclic trimer and the ion-exchange catalyst is present in an amount of about 1 to 20 parts by weight per 100 parts by weight of cyclic trimer, and recovering a hydroxy-endblocked linear diorganopolysiloxane product from the reaction mixture.

6. A process as claimed in claim 5 wherein the solvent is selected from the class consisting of acetone, methylethylketone and tetrahydrofuran.

7. A process for the production of hydroxy-endblocked linear dimethylpolysiloxanes which comprises contacting cyclic dimethylpolysiloxane trimer with water in the presence of an ion-exchange catalyst, and recovering a hydroxy-endblocked linear dimethylpolysiloxane product from the reaction mixture.

8. A process for the production of hydroxy-endblocked linear dimethylpolysiloxanes which comprises contacting cyclic dimethylpolysiloxane trimer with water in the presence of an ion-exchange catalyst and a water miscible inert organic solvent, and recovering a hydroxy-endblocked linear dimethylpolysiloxane product from the reaction mixture.

9. A process as claimed in claim 8 wherein the solvent is selected from the class consisting of acetone, methylethylketone and tetrahydrofuran.

10. A process for the production of hydroxy-endblocked linear dimethylpolysiloxanes containing from about 3 to about 14 weight percent hydroxy groups which comprises contacting cyclic dimethylpolysiloxane trimer with water in the presence of an ion-exchange catalyst and a water miscible inert organic solvent, wherein the water is present in an amount of about four moles of water for each mole of cyclic trimer and the ion-exchange catalyst is present in an amount of about 1 to 20 parts by weight per 100 parts by weight of cyclic trimer and recovering the desired hydroxy-endblocked linear dimethylpolysiloxane product from the reaction mixture.

11. A process as claimed in claim 10 wherein the solvent is selected from the group consisting of acetone, methylethylketone and tetrahydrofuran.

12. A process for the production of hexamethyltrisiloxane-1,5-diol which comprises contacting cyclic dimethylpolysiloxane trimer with water in the presence of a strongly-acid cation exchange resin, and recovering hexamethyltrisiloxane-1,5-diol from the reaction mixture.

13. A process for the production of hexamethyltrisiloxane-1,5-diol which comprises contacting cyclic dimethylpolysiloxane trimer with water in the presence of a strongly-acid cation exchange resin and a water miscible inert organic solvent, and recovering hexamethyltrisiloxane-1,5-diol from the reaction mixture.

14. A process as claimed in claim 13 wherein the solvent is selected from the group consisting of acetone, methylethylketone and tetrahydrofuran.

15. A process for the production of dodecamethylhexasiloxane-1,11-diol which comprises contacting cyclic dimethylpolysiloxane trimer with water in the presence of a strongly-basic anion exchange resin, and recovering dodecamethylhexasiloxane-1,11-diol from the reaction mixture.

16. A process for the production of dodecamethylhexasiloxane-1,11-diol which comprises contacting cyclic dimethylpolysiloxane trimer with water in the presence of a strongly-basic anion exchange resin and a water miscible inert organic solvent, and recovering dodecamethylhexasiloxane-1,11-diol from the reaction mixture.

17. A process as claimed in claim 16 wherein the solvent is selected from the group consisting of acetone, methylethylketone and tetrahydrofuran.

References Cited by the Examiner

UNITED STATES PATENTS

| | | | |
|---|---|---|---|
| 2,607,792 | 8/1952 | Warrick | 260—448.2 |
| 2,779,776 | 1/1957 | Hyde et al. | 260—448.2 |
| 2,831,008 | 4/1958 | Knopf et al. | 260—448.2 |
| 2,863,897 | 12/1958 | Wehrly | 260—448.2 |
| 3,046,293 | 7/1862 | Pike | 260—448.2 |
| 3,046,294 | 7/1962 | Pike | 260—448.2 |

FOREIGN PATENTS 1,281,880  12/1961  France.

TOBIAS E. LEVOW, *Primary Examiner.*

SAMUEL H. BLECH, *Examiner.*

P. F. SHAVER, *Assistant Examiner.*